US011609354B2

(12) United States Patent
Nyberg et al.

(10) Patent No.: US 11,609,354 B2
(45) Date of Patent: Mar. 21, 2023

(54) METHOD OF PROCESSING A GEOSPATIAL DATASET (71) Applicant: SHELL OIL COMPANY, Houston, TX (US)

(72) Inventors: Timothy Paul Nyberg, Houston, TX (US); Vibhor Aggarwal, Bengaluru (IN)

(73) Assignee: SHELL USA, INC., Houston, TX (US)

(*) Notice: Subject to any disclaimer, the term of this patent is extended or adjusted under 35 U.S.C. 154(b) by 817 days.

(21) Appl. No.: 16/301,705

(22) PCT Filed: Nov. 29, 2016

(86) PCT No.: PCT/US2016/063976
§ 371 (c)(1),
(2) Date: Nov. 14, 2018

(87) PCT Pub. No.: WO2017/209787
PCT Pub. Date: Dec. 7, 2017

(65) Prior Publication Data
US 2019/0285770 A1   Sep. 19, 2019

(30) Foreign Application Priority Data
Jun. 2, 2016  (IN) .............................. 201641018938

(51) Int. Cl.
G01V 99/00 (2009.01)
G01V 3/38 (2006.01)
(Continued)

(52) U.S. Cl.
CPC ................ G01V 99/00 (2013.01); G01V 1/50 (2013.01); G01V 3/38 (2013.01); G06T 1/20 (2013.01); G01V 1/28 (2013.01)

(58) Field of Classification Search
CPC . G01V 99/00; G01V 3/38; G01V 1/28; G06T 1/20
See application file for complete search history.

(56) References Cited

U.S. PATENT DOCUMENTS 6,058,377 A    5/2000  Traub et al.
6,529,193 B1*  3/2003  Herken ................... G06T 15/50
                                                    345/426
(Continued)

FOREIGN PATENT DOCUMENTS

WO   2009039269 A2   3/2009
WO   2015077170 A1   5/2015
WO   2015077171 A2   5/2015

OTHER PUBLICATIONS

International Search Report and Written Opinion received for PCT Patent Application No. PCT/US2016/063976, dated Mar. 13, 2017, 9 pages.
(Continued)

Primary Examiner — Alessandro V Amari
Assistant Examiner — Lal C Mang
(74) Attorney, Agent, or Firm — Shell USA, Inc.

(57) ABSTRACT

Data objects of a geospatial data set are arranged in a low-discrepancy sequence spanning over a pre-defined interval, and assigned to N computing units based on in which sub-interval within the pre-defined interval the point, to which the data object belongs, falls. A subset of the data objects that have been distributed over the N computing units is subjected to processing operations by computer readable instructions loaded on each of the N computing units.

15 Claims, 3 Drawing Sheets (51) Int. Cl.
*G01V 1/50* (2006.01)
*G06T 1/20* (2006.01)
*G01V 1/28* (2006.01)

(56) References Cited

U.S. PATENT DOCUMENTS

| | | | |
|---|---|---|---|
| 6,959,104 B2 | 10/2005 | Rajagopal et al. | |
| 7,453,461 B2 | 11/2008 | Keller | |
| 2003/0216897 A1* | 11/2003 | Endres | G01V 11/00 703/10 |
| 2005/0288813 A1* | 12/2005 | Yang | B22F 3/1055 700/119 |
| 2007/0219724 A1 | 9/2007 | Li et al. | |
| 2008/0050024 A1 | 2/2008 | Aguera Y Arcas | |
| 2010/0211370 A1 | 8/2010 | Maliassov | |
| 2011/0054869 A1* | 3/2011 | Li | G06F 30/20 703/10 |
| 2014/0257780 A1* | 9/2014 | Jing | G06F 30/20 703/6 |
| 2014/0270164 A1 | 9/2014 | Aggarwal et al. | |
| 2015/0338550 A1 | 11/2015 | Wadsley | |

OTHER PUBLICATIONS

Yan et al., "Is Apache Spark Scalable to Seismic Data Analytics and Computations?", 2015 IEEE International Conference on Big Data (Oct. 29-Nov. 1, 2015), 10 pages.

Sobol, "On the Distribution of Points in a Cube and the Approximate Evaluation of Integrals", U.S.S.R. Computationa Mathematics and Mathematical Physics, vol. 7, Issue No. 4,1967, pp. 86-112.

Hammersley, "Monte Carlo Methods for Solving Multivariable Problems", Part III. Related Problems, Annals of the New York Academy of Sciences, vol. 86, Issue No. 3, May 1960, pp. 844-874.

Halton, "On the Efficiency of Certain Quasi-random Sequences of Points in Evaluating Multi-dimensional Integrals", Numerische Mathematik, vol. 2, Issue No. 1, Dec. 1960, pp. 84-90.

Niederreiter, "Low-Discrepancy and Low-Dispersion Sequences", Journal of Number Theory, vol. 30, Issue No. 1, 1988, pp. 51-70.

Yu et al., "GeoSpark: A Cluster Computing Framework for Processing Large-Scale Spatial Data", Proceedings of 23rd ACM SIGSPATIAL International Conference on Advances in Geographic Information Systems, Nov. 3-6, 2015, 4 pages.

Uta et al., "Scalable In-Memory Computing", 15th IEEE/ACM International Symposium on Cluster, Cloud and Grid Computing, May 4-7, 2015, 6 pages.

"Low-discrepancy sequence", Wikipedia, https://en.wikipedia.org/wiki/Low-discrepancy_sequence, Accessed on May 26, 2016, 8 pages.

Van Der Corput, "Proceedings of the Section of Sciences", Proceedings of the Koninklijke Nederlandse Akademie van Wetenschappen, vol. 38, Issue No. 6-10, 1935, 19 pages.

Faure, "Discrepancy of sequences associated with a numeration system(in dimension s)", Acta Arithmetica, vol. 41, 1982, pp. 337-351.

* cited by examiner

METHOD OF PROCESSING A GEOSPATIAL DATASET

CROSS REFERENCE TO RELATED APPLICATIONS

This is a national stage application of International Application No. PCT/US2016/063976, filed 29 Nov. 2016, and claims benefit of Indian Application No. 201641018938, filed 2 Jun. 2016.

FIELD OF THE INVENTION

The present invention relates to a method of processing a geospatial dataset. Examples of geospatial datasets include seismic survey datasets and electromagnetic survey datasets.

BACKGROUND OF THE INVENTION

Geospatial datasets are prevalent in the oil and gas exploration industry. Seismic surveys, optionally supplemented with electromagnetic surveys, are conducted for locating hydrocarbon reservoirs below the earth's surface both onshore and offshore. The costs of drilling a well for extraction are extremely high, and therefore making an accurate and a quick decision on the location and the volume of hydrocarbons is advantageous. These analyses typically refine and interpret geophysical imagery by enhancing the signal to noise ratio.

Large geophysical datasets (which nowadays can be as large as multiple terabytes) are pervasive in the industry and in-memory computing is now being developed to handle such datasets. Reading large datasets from disk-based storage is not fast enough for interactive analysis; therefore, the datasets have to be stored in random-access memory (RAM). A single compute node may not have enough RAM to store the complete dataset and therefore, the dataset has to be loaded into distributed compute nodes.

A recent paper from the 2015 IEEE International Conference on Big Data (29 Oct.-1 Nov. 2015), authored by Yuzhong Yan et al, for instance, asks the question: "Is Apache Spark Scalable to Seismic Data Analysis and Computations?" The paper describes the need for geophysicists for an easy-to-use and scalable platform that allows them to incorporate the latest big data analytics technology with the geoscience domain knowledge to speed up their innovations in the exploration phase. Although there are some big data analytics platforms available in the market, they are not widely deployed in the petroleum industry since there is a big gap between these platforms and the special needs of the industry.

One of the shortcomings is that a suitable load-balancing strategy for geospatial datasets is lacking.

SUMMARY OF THE INVENTION

In accordance with a first aspect of the present invention, there is provided a method of processing a geospatial dataset, comprising steps of:
- providing a geospatial data set comprising a plurality of data objects distributed in a multi-dimensional grid of points;
- arranging the points in a low-discrepancy sequence within in a pre-defined interval, wherein each of the points receives one unique output value of a quasi-random generator within in said pre-defined interval;
- providing a distributed computer system having N computing units available for use, whereby N 2;
- equally dividing the pre-defined interval in N sub-intervals, whereby all of the N sub-intervals together cover the pre-defined interval and whereby there is no overlap of any one of the N sub-intervals with any other of the N sub-intervals;
- assigning exclusively one of the N computing units to exclusively one of the N sub-intervals and, for all n within $1 \leq n \leq N$, assigning the data objects of all points that have received the output value that lies within an $n^{th}$ sub-interval of the N sub-intervals to an $n^{th}$ computing unit of said N computing units;
- subjecting a subset of the data objects that have been distributed over the N computing units to processing operations by computer readable instructions on each of the N computing units.

BRIEF DESCRIPTION OF THE DRAWING

The invention will be further illustrated hereinafter by way of example only, and with reference to the non-limiting drawing. The drawing consists of the following figures.

These figures are schematic and not to scale.

DETAILED DESCRIPTION OF THE INVENTION

It has been found that the compute power of a single computing unit may not be sufficient for interactive analysis and thus the dataset may also be spread across multiple computing units to increase performance. The interactivity of the analysis is directly governed by the distribution of the dataset across such a distributed system. If the dataset is distributed such that the computation is equally balanced across all the computing units, then maximum performance can be obtained. This disclosure presents a novel way of distributing geospatial data across a set of compute computing units in a load-balanced way.

The term "computing unit" as used herein can be an actual (physical) computer node. However, it may also be interpreted as a distinct computer process whereby multiple of such processes may reside on a single computer node.

In the presently proposed method, the data objects of the geospatial data set are arranged in a low-discrepancy sequence spanning over a pre-defined interval, and assigned to the computing units based on in which sub-interval within the pre-defined interval the point, to which the data object belongs, falls.

Herewith it is achieved not only that the data objects are distributed over the computing units in a load-balanced manner, but also that subsets of the data objects that geophysicists typically subject to processing operations, by computer readable instructions on the computing units, are also load-balanced. These computer readable instructions may for instance be loaded on the computing units and/or sent by a client.

One or more of the data objects may be loaded onto the computing unit that they are assigned to. This may for instance be done by directly loading the data objects of all points that have received the output value that lies within an $n^{th}$ sub-interval of the N sub-intervals to an $n^{th}$ computing unit of said N computing units, or by loading on-demand.

Subsets of the data objects that geophysicists typically subject to processing operations are often based on geometric queries. A geometric query may for example be a region-bound query or a set of disjoint region queries. These can all work in the proposed method. WO 2015/077170 illustrates an example where improved stacks and 3D images are generated from wide azimuth data based on user-defined masks on selected parts of the geospatial data.

For proper understanding, it should be noted that the multi-dimensionality of the grid of points should not be confused with the dimensionality of the geospatial data set. The multi-dimensional grid of points reflects a geographical spread. The data objects associated with the grid of points have a dimensionality of their own. The grid of points can be uniquely mapped to coordinates on or in the earth. For typical survey data, such as typical seismic or electromagnetic, the geographical coordinates of each data object are mapped into a grid of points, where each point can be indexed by natural numbers. In such cases, the grid of points thus is typically a two-dimensional grid spanning over a region of interest on the earth's surface. For other types of geospatial data, it may be a three-dimensional grid of points. An example is a dynamic flow data within a 3D reservoir, which may typically be stored in a grid-box within a volume (so-called voxels).

The subset of the data objects being subjected to processing operations suitably belong to a smaller number of geospatial points than that there are geospatial points in the multi-dimensional grid of points. The geospatial points underlying the subset of data objects may for example be defined in a smaller number of dimensions than the multi-dimensional grid of points. This is known as a slice through the data. For instance, if the geospatial data set is distributed on a two-dimensional grid of points, a typical slice may have a one-dimensional grid of points.

Figure 1:
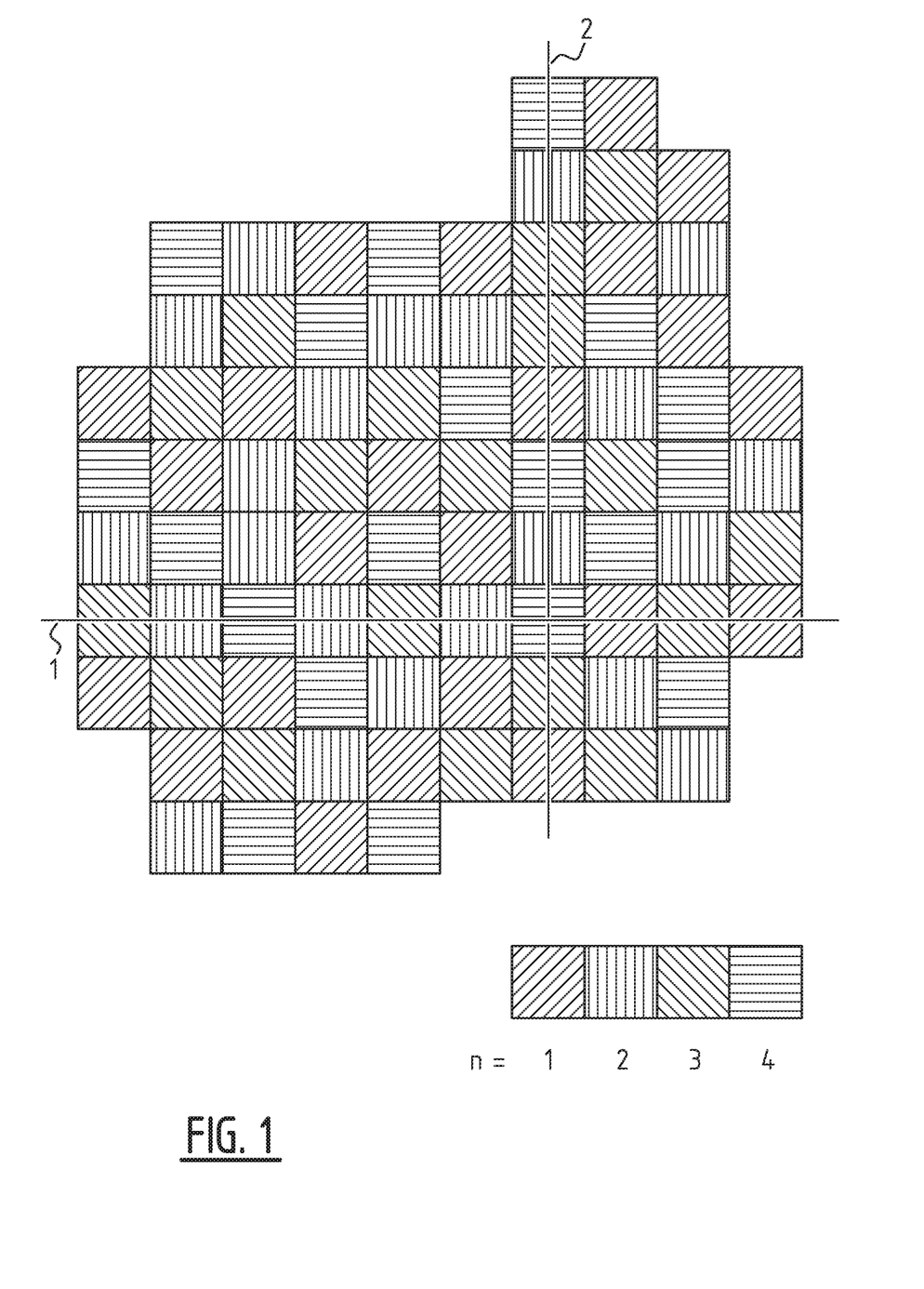
FIG. 1 shows a schematic example of a multi-dimensional grid of points representing a spread over a region of interest in or on the earth.

Interesting slices within typical geospatial datasets may be subsets of data objects that belong to a slice of mutually neighboring points in the multi-dimensional grid of the geospatial data set. The concept is schematically illustrated in FIG. 1, which shows as a simplified example a multi-dimensional grid of points, each point being represented by a hatched square field. The multi-dimensional grid of points typically represents a spread over a geographical region of interest in or on the earth. In the simplified example, a small 2-dimensional grid of geospatial points is distributed over four computing units of a distributed computer system (N=4), each represented by one type of hatching as shown in the legend. The computing units are suitably numbered n=1 to n=4, but the skilled person will appreciate that any unique identifier can be used.

The points have been arranged in a low-discrepancy sequence within in a pre-defined interval, for instance [0, 1), whereby [ indicates lower limit of interval is included in the interval and ) indicates upper limit of the interval is excluded from the interval. Each of the points received one unique output value of a quasi-random generator within in said pre-defined interval.

The pre-defined interval was divided in four sub-intervals. All of the four sub-intervals together cover the pre-defined interval and whereby there is no overlap of any one of the sub-intervals with any other of the sub-intervals. Suitably, the sub-intervals are equally sized. In the present example, the sub-intervals were [0, 0.25); [0.25, 0.50); [0.50, 0.75); and [0.75, 1). Exclusively one of the four computing units was assigned to exclusively one of the sub-intervals, whereby a one-on-one mapping strategy was employed. In this case, the first computing unit (n=1) was assigned to the [0, 0.25) interval, the second (n=2) to the [0.25, 0.50) interval, and so on until all were mapped. The appropriate computing unit for the data object of each point can now be chosen, corresponding to the sub-interval in which the output of the quasi-random generator for that point lies.

FIG. 1 shows which data objects belonging to which point are loaded on the $n^{th}$ computing unit (n is a natural number ranging from 1 to N). These are the points that received the output value from the quasi-random generator that lies within the $n^{th}$ sub-interval. Also drawn are examples of slices. Line 1 shows a horizontal slice and line 2 a vertical slice. It can be seen that the geospatial points in each slice are relatively equally distributed over the available computing units for any slice, thus that the available computing units are load-balanced for data processing operations within any of the slices.

Thus, a mapping is created from a set of geospatial points to a set of computing units such that the distribution of points mapped to each computing unit is load-balanced. This means that roughly equal number of points will be selected on each computing unit for resolving spatial queries on the data, thereby load-balancing the slice computations. Once all the data objects are assigned, they may be loaded on the N computing units (in-memory computing) or loaded on-demand. The user (generally a geophysical interpreter) can do things such as changing parameters for refining images, and getting interactive feedback which would have otherwise been infeasible. The method of the invention allows quick interactive response from the distributed system to the interpreter. WO 2015/077171 illustrates an example of an interactive user interface that could be integrated with the presently proposed method. The user is generally interested in receiving a fast response to the selections.

The subset of the data objects being subjected to data processing or image processing operations may be a user-selected subset. Notwithstanding, it may also be desired to select and/or compute slices based on computer implemented algorithms, which may be an automated selection.

Quasi-random sequences are distinct from random or pseudo-random sequences. Quasi-random sequences are somewhere between sequences of random numbers and regular sequences. Quasi-random sequences, as known in mathematics, are in fact deterministic. They have been designed such that each additional sample is chosen to fill a sampling space more uniformly avoiding clustering with previously generated samples. For this reason, they are also known as low-discrepancy sequences.

The discrepancy of a given sequence measures its deviation from an ideal uniform distribution. For a one dimensional sequence $x_1, \ldots, x_N$ it is defined as:

$$D_N = D_N(x_1, \ldots, x_N) = \sup_{0 \leq \alpha \leq \beta \leq 1} \left| \frac{A([\alpha, \beta); N)}{N} - (\beta - \alpha) \right|.$$

Herein $A([\mu, \beta); N)$ is the counting function which is defined as the number of terms $x_i$, $1 \leq i \leq N$ for which $x_i \in [\alpha, \beta)$, given a positive integer N and $[\alpha, \beta) \subset I$, where $I = [0, 1)$. A special form of discrepancy, known as star discrepancy, $D_N^*$ is defined as:

$$D_N^* = D_N^*(x_1, \ldots, x_N) = \sup_{0 \le \alpha \le 1} \left| \frac{A([0, \alpha); N)}{N} - (\alpha) \right|.$$

These can be extended to a multi-dimensional sequence $X_1, \ldots, X_N$, as:

$$D_N = D_N(X_1, \ldots, X_N) = \sup_J \left| \frac{A(J; N)}{N} - \lambda(J) \right| \text{ and}$$

$$D_N^* = D_N^*(X_1, \ldots, X_N) = \sup_{J^*} \left| \frac{A(J^*; N)}{N} - \lambda(J^*) \right|.$$

In these, $J$ iterates through subintervals of $I^k$ such that $J=\{(X_1, \ldots, X_N) \in I^k: \alpha_i \le X_i \le \beta_i \text{ for } 1 \le i \le k\}$ and $J^*=\{(X_1, \ldots, X_N) \in I^k: 0 \le X_i \le \alpha_i \text{ for } 1 \le i \le k\}$. Here $\lambda$ represents the k-dimensional Lebesgue measure.

The smaller the discrepancy of a sequence, the better the spacing between the samples. It is an accepted criterion that a d-dimensional sequence with N points satisfying the following inequality:

$$D_N^* \le C_d \frac{(\ln N)^d}{N},$$

is considered to be a low-discrepancy sequence ($C_d$ is a constant dependent on d only).

There are various quasi-random generators available, which are based on low-discrepancy sequence generating algorithms, and all have slightly different properties. Examples include: Sobol (reference: I. M. Sobol, "On the distribution of points in a cube and the approximate evaluation of integrals" in U.S.S.R. Computational Mathematics and Mathematical Physics Vol. 7 (1967), pp 86-112); Van der Corput (reference: J. G. Van der Corput, "Verteilungsfunktionen I and II" in Proc. Nederl. Akad. Wetensch. (1935)); Hammersley (reference: J. Hammersley, "Monte Carlo Methods for Solving Multivariable Problems" in Annals of the New York Academy of Sciences Vol. 86 (May 1960), pp. 844-874); Halton (reference: J. H. Halton, "On the efficiency of certain quasi-random sequences of points in evaluating multi-dimensional integrals" in Numerische Mathematik Vol. 2(1) (1960), pp. 84-90); Faure (reference: H. Faure, "Discrépances de suites associées à un système de numération (en dimension un)" in Annals of the New York Academy of Sciences Vol. 41 (1982), pp. 337-351); and Niederreiter (reference: H. Niederreiter, "Low-discrepancy and low-dispersion sequences" in Journal of Number Theory Vol. 30(1) (1988), pp. 51-70). The references cited in parenthesis are incorporated herein by references. For the purpose of the present disclosure, sequences generated by any of these quasi-random generators are understood to be low-discrepancy sequences.

The low-discrepancy properties of these sequences make them suitable for load-balanced distribution of data objects, as all data objects in each sub-sequence of the generated distribution are well spread across the domain. In contrast, a random sampling technique would not guarantee a low-discrepancy between each sub-sequence of the generated sequence, as they tend to exhibit some clustering which makes them less suitable for distributing data objects.

The multi-dimensional grid of points can be divided over the N available computing units directly using the result of a multi-dimensional low-discrepancy sequence generator. However, a preferred option in the context of the present disclosure is to first linearize the multi-dimensional grid of points to a one-dimensional array and then to use the one-dimensional array as input to the quasi-random generator. While the resulting discrepancy viewed in the multiple dimensional grid is found to be slightly higher compared to a multi-dimensional low-discrepancy sequence generator, this slight less well performance in load-balancing is offset by the fact that this approach is computationally much more efficient. One way of achieving this is by indexing the multi-dimensional grid of points in a one-dimensional array of index numbers m, and subsequently using the index numbers m as input to the quasi-random generator to determine the sequencing of the geospatial points. The numbers m are suitably natural numbers from 1 to M, wherein M corresponds to a total number of points comprised in the geospatial data set.

It is found that a preferred way to linearize the multi-dimensional grid of points is by preserving as much as possible the geospatial relationships between the points. In a two-dimensional grid, this can be achieved by appending the neighboring rows of points row-by-row head to tail forming a chain of rows until all rows have been added, or by appending the neighboring columns of points column-by-column, top to bottom, forming a chain of columns until all columns have been added. This principle of nested appending can be extended to higher dimensionality. For instance, if the multi-dimensional grid of point is $\Delta$ dimensional, the dimensions can be indexed by a first complete set of natural numbers $d \le \Delta$ ($d=1, \ldots, \Delta$). The points within the $\Delta$ dimensional grid can be indexed by a second complete set of natural numbers for each of the dimensions ($j_1 \ldots j_\Delta$), whereby $j_d \le J_d$ for each d. In other words, the index $j_1$ for the first dimension runs from $j_1=1$ to $j_1=J_1$; the index $j_2$ for the first dimension runs from $j_2=1$ to $j_2=J_2$ and so on until the last dimension $\Delta$. The one-dimensional array of index numbers m may then be obtained by nested sequencing of each second complete set of natural numbers $j_d$ through the dimensions $d=1, \ldots, \Delta$. The nesting order can be, but does not have to be, the same as the numbering d of the dimensions. It has been found that the low-discrepancy properties are best achieved when linearizing is performed in this manner.

Figure 2:
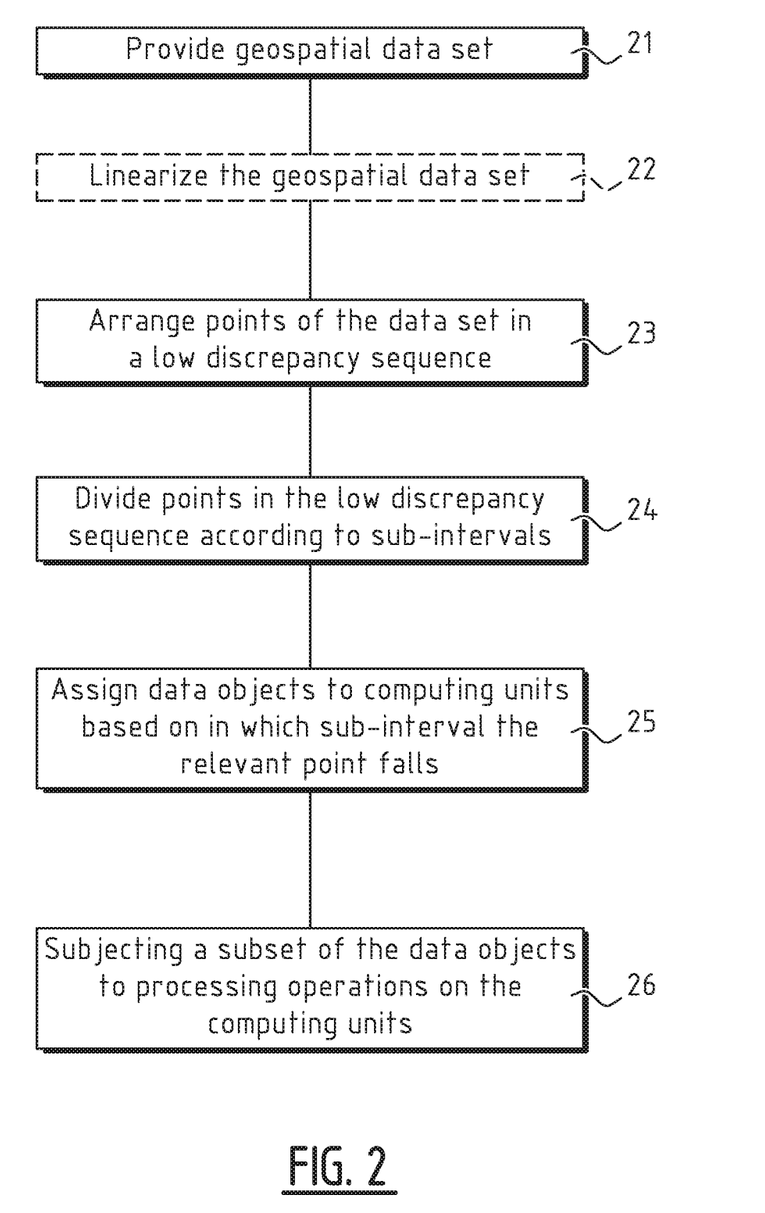
FIG. 2 shows a flow chart summarizing aspects of the present method.

The method of the present disclosure as described so far is summarized in FIG. 2. First a geospatial dataset is provided (21), which geospatial dataset comprises a plurality of data objects distributed in a multi-dimensional grid of points. Then the geospatial points of the data set are arranged in a low-discrepancy sequence (23), using a quasi-random generator. This may optionally be preceded by linearizing the geospatial data set (22). The points in the low discrepancy sequence may now be divided over N computing units according to a selection based dividing the low-discrepancy sequence in sub-intervals (24). The data objects of each geospatial point may now be assigned to the computing units in accordance with the sub-interval in which the point falls (25). Finally, a subset of the data object is subjected to processing operations on the computing units (26).

Another issue that is relevant for geophysical data processing is the robustness of the distributed computing system against failure of one or more of the N computing units during processing. It has been found that the load-balanced distribution of geospatial data sets over computing units, based on quasi-random sequencing as described above, also provides a suitable starting point for applying so-called consistent hashing concepts without employing any random features of consistent hashing methodologies. This places the distributed computer system to adapt to changes in number of available computing units in a way that balances computational efficiency against loss of the unique properties of the quasi-random distribution.

Figure 3:
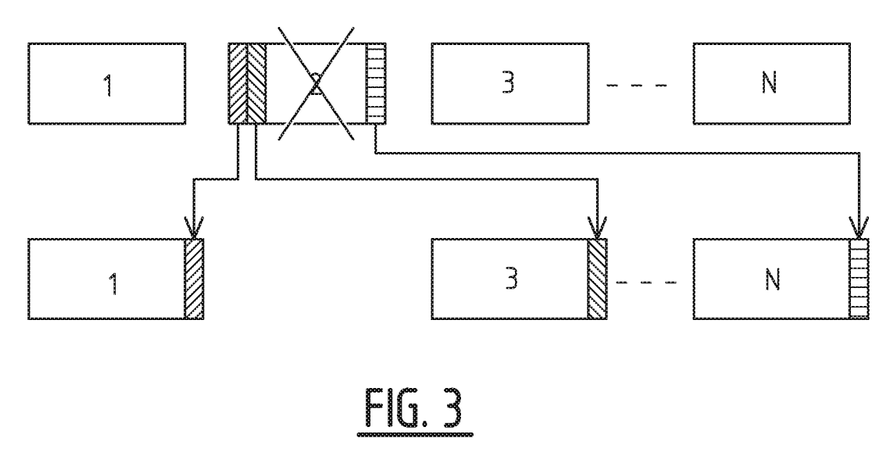
FIG. 3 schematically illustrates an example of re-assigning of data objects in case a computing unit drops out.

As all sub-intervals of selected points already have low-discrepancy properties, the sub-interval that happened to be assigned to a failing computation unit may be further divided into sub-sub-intervals. Based on the original low-discrepancy sequencing, the data objects belonging to points that were assigned to the failing computation unit may be uniquely re-assigned to selected ones of the computing units that have not failed, whereby all of the remaining computing units receive a share of these data objects. This is shown schematically in FIG. 3, where the situation is exemplified that computational unit 2 becomes unavailable. Data objects, indicated by hatched rectangles, are re-assigned to remaining computing units. This approach avoids any random intervention, which inadvertently may lead to undesired clustering of data object assignments to computing units. Data objects that were already assigned to the remaining computing units that are still available for use remain assigned to the same computing unit as they already were. Hence, only the affected data objects are re-assigned, thus keeping the re-assigning of data objects to a minimum.

Figure 4:
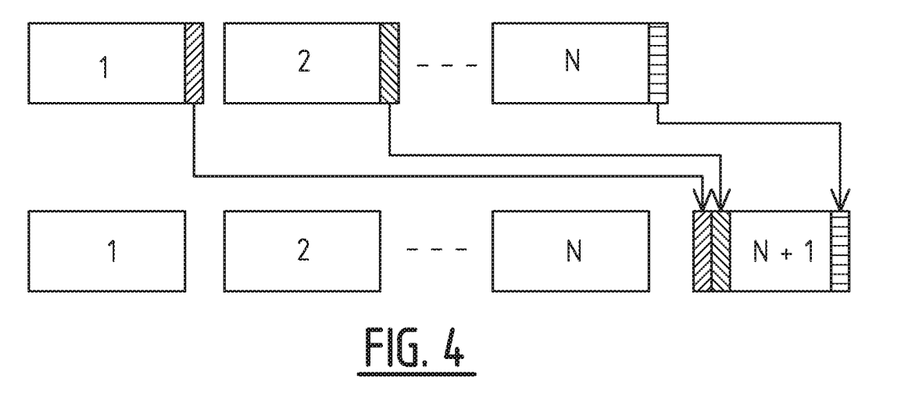
FIG. 4 schematically illustrates an example of re-assigning of data objects in case an additional computing unit becomes available.

Similarly, if the number of available computing units increases, sub-sub-interval selection of data objects may be employed in each of the pre-existing computing units, thereby exploiting the fact that the low-discrepancy property is preserved. This is illustrated in FIG. 4.

Thus, the event where one or more of said N computing units becomes disabled during the step of subjecting the data objects that have been distributed over the N computing units to processing operations, may be summarized as follows. The data objects from a failing computing unit are redistributed over all remaining computing units of said N computing units that are still available for use, whereby uniquely assigning selected data objects of the failing computing unit to selected ones of the remaining computing units whereby all of the remaining computing units receive a share of the data objects from the failing computing unit. The selected data objects are preferably selected based on the received output value of the quasi-random generator and an equal division of each sub-interval of the failing computing units into sub-sub-intervals, whereby the sub-sub-interval into which the geospatial point of a selected data object falls (based on its original output value of the quasi-random generator) determines to which computing unit the selected data object will be re-assigned. The number of sub-sub-intervals is preferably at least as large as the number of remaining computing units of said N computing units that are still available for use. The number of sub-sub-intervals may suitably be equal to the number of remaining computing units of said N computing units that are still available for use, or a multiple of N (the multiplication factor is preferably a natural number).

Similar to explained above for the sub-intervals, suitably all of the sub-sub-intervals together cover the sub-interval of the failed computing unit. There is preferably no overlap of any one of sub-sub-intervals with any other of the sub-sub-intervals within the same failed computing unit. Exclusively one of the remaining computing units is re-assigned to exclusively one of the sub-sub-intervals.

The event wherein, during the step of subjecting the data objects to processing operations, one or more additional computing units are made available in addition to said N computing units that have been distributed over the N computing units to processing operations, may be summarized as follows. Data objects are selected from each of the N computing units and re-assigning the selected data objects of each of the computing units to the one or more additional computing units, whereby all of the N computing units contribute a share of the data objects that are re-assigned to the one or more additional computing units. The selection of data objects for re-assigning is preferably based on the received output value of the quasi-random generator and a suitable division of each sub-interval of the N computing units into sub-sub-intervals, whereby the sub-sub-interval into which the geospatial point of a selected data object falls (based on its original output value of the quasi-random generator) determines which data objects will be re-assigned to the added computing units.

The distributed computer system may comprise a coordinator to perform certain coordination functions in one place. The coordinator may be any computer that all the computing units in the distributed computer system can communicate with. The coordinator may be one of the N computing units or another machine. A machine may be preferred, as the coordinator itself is advantageously fault tolerant. The coordinator may assign each of the computing units with the appropriate identifier (e.g. number n). The coordinator may also maintain an ordered list of computing unit changes and their numbers. For the case where the number of computing units does not change, the coordinator does not need to store information on data object mapping/sub-interval assignments because this can be easily calculated on the basis of the numbering of the computing units. In cases where the number of computing units does change, the coordinator may store an allocation table of the sub-intervals and the sub-sub intervals that are mapped to a computing unit. The coordinator will not need to store where the data for each object goes explicitly if it keeps track of the sub-interval and sub-sub-interval to computing unit mappings.

However, it is to be understood that a coordinator may not be necessary for each of these functions. Assume the network evolves from logical state A to B to C, etc. . . . , whereby each logical state has a universally unique identifier (e.g. A, B, C, . . . ) and is defined as a set of processes, where each process also is uniquely identified (for example by a process ID+IP address+port+random salt). Further, each process has an assignment of sub-intervals and sub-sub intervals for the particular state. What is needed is: (a) ability to detect events that indicate the actual state no longer matches the last agreed to logical state (e.g. a process no longer responds to health check requests); and (b) a consensus algorithm whereby all of the participating processes agree on a new current logical state. The coordinator may be helpful to solve this in a somewhat centralized manner. However, it is envisaged that it is also be possible to solve this in a fully distributed manner, without requiring a coordinator as described above.

Clients do not have to be not part of the cluster of computing units, but they preferably also receive the same information about the ordered states. When a client wants to compute something it uses the information from the latest state and sends requests to processes in that state. When a process in a cluster receives a request it will determine which data objects are assigned to it according to the state identifier sent by the client. If the cluster is transitioning to a new state, it is possible that when a client request reaches multiple processes they may differ at that moment in what they know to be the latest logical state. Using the state identifier sent by the client when processing a request insures that every process involved in the request uses the same mapping of data objects to intervals to processes.

The presently disclosed method of processing a geospatial dataset and distributed computer system may employed for delineating a reservoir rock in the geospatial dataset by finding an attribute in one or more of the subsets of the data objects of the geospatial dataset. Once such reservoir rock has been delineated from the geospatial dataset, a well may be drilled to the reservoir rock below the earth's surface to produce mineral hydrocarbons from the reservoir rock and/or to store fluids in the reservoir rock. The geospatial dataset discussed in the present disclosure may be or have been obtained by physically measuring signal responses in the geographical region of interest. The region of interest may comprise one or more layers of reservoir rock, capable of holding producible mineral hydrocarbons, such as oil and/or gas, or of holding fluids for storage. Examples of such fluids include natural gas that has been produced elsewhere, and captured carbon dioxide. The subset of data objects analyzed in accordance with the method and/or with the distributed computer system of the present disclosure may comprise attributes related to the reservoir rock. The computer-implemented method described herein may further comprise a step of using the subset of data objects to identify the reservoir rock, which is subsequently used to produce the mineral hydrocarbons from the reservoir rock and/or to store fluids in the reservoir rock.

The person skilled in the art will readily understand that, while the invention is illustrated making reference to one or more a specific combinations of features and measures, many of those features and measures are functionally independent from other features and measures such that they can be equally or similarly applied independently in other embodiments or combinations.

The person skilled in the art will understand that the present invention can be carried out in many various ways without departing from the scope of the appended claims. Finally, for the avoidance of doubt, it is remarked that while the appended claims are written in single-dependent format, all combinations of claim 1 with any number of single-dependent claims form part of the present disclosure.

That which is claimed is:

1. A method of processing a geospatial dataset, comprising steps of:
   providing a geospatial data set comprising a plurality of data objects distributed in a multi-dimensional grid of points;
   arranging the points in a low-discrepancy sequence within in a pre-defined interval, wherein each of the points receives one unique output value of a quasi-random generator within in said pre-defined interval;
   providing a distributed computer system having N computing units available for use, whereby N≥2;
   equally dividing the pre-defined interval in N sub-intervals, whereby all of the N sub-intervals together cover the pre-defined interval and whereby there is no overlap of any one of the N sub-intervals with any other of the N sub-intervals;
   assigning exclusively one of the N computing units to exclusively one of the N sub-intervals and, for all n within 1≤n≤N, assigning the data objects of all points that have received the output value that lies within an $n^{th}$ sub-interval of the N sub-intervals to an $n^{th}$ computing unit of said N computing units;
   subjecting a subset of the data objects that have been distributed over the N computing units to processing operations by computer readable instructions on each of the N computing units.

2. The method of claim 1, wherein the subset of the data objects being subjected to said processing operations belong to a smaller number of geospatial points than there are geospatial points in the multi-dimensional grid of points.

3. The method of claim 1, wherein the subset of the data objects being subjected to said processing operations belong are defined in a smaller number of dimensions than the multi-dimensional grid of points.

4. The method of claim 1, wherein the subset of the data objects being subjected to said processing operations belong to a slice of mutually neighboring points in the multi-dimensional grid of the geospatial data set.

5. The method of claim 1, wherein the subset of the data objects being subjected to said processing operations is a user-selected subset.

6. The method of claim 1, wherein the quasi-random generator is selected from the group consisting of: Sobol, Van der Corput, Hammersley, Halton, Faure, and Niederreiter.

7. The method of claim 1, wherein the step of arranging the points in a low-discrepancy sequence within in a pre-defined interval comprises indexing the multi-dimensional grid of points in a one-dimensional array of index numbers m, and subsequently using the index numbers m as input to the quasi-random generator.

8. The method of claim 7, wherein the multi-dimensional grid of point is $\Delta$ dimensional, wherein the dimensions are indexed by a first complete set of natural numbers d≤$\Delta$ (d=1, . . . , $\Delta$), and wherein the points are indexed by a second complete set of natural numbers for each of the dimensions ($j_1 \ldots j_\lambda$) whereby $j_d \leq J_d$ for each d, and wherein the one-dimensional array of index numbers m is obtained by nested sequencing of each second complete set of natural numbers $j_d$ through the dimensions d=1, . . . , $\Delta$.

9. The method of claim 1, wherein one or more of the data objects are loaded onto the computing unit that they are assigned to.

10. The method of claim 1, wherein, during said step of subjecting the data objects that have been distributed over the N computing units to processing operations, one or more of said N computing units become failed computing units that are disabled for use, upon which a step of redistributing the data objects is executed whereby the data objects that were assigned to the failed computing units are re-distributed over all remaining computing units of said N computing units that are still available for use, comprising uniquely assigning selected data objects of each failed computing unit to selected ones of the remaining computing units, whereby all of the remaining computing units receive a share of the data objects from the failed computing unit.

11. The method of claim 10, wherein selected data objects are selected based on the received output value of the quasi-random generator and an equal division of each sub-interval of the failed computing units into sub-sub-intervals.

12. The method of claim 11, wherein the number of sub-sub-intervals is at least as large as the number of remaining computing units of said N computing units that are still available for use.

13. The method of claim 11, wherein all of the sub-sub-intervals together cover the sub-interval of the failed computing unit, and whereby there is no overlap of any one of sub-sub-intervals with any other of the sub-sub-intervals within the same failed computing unit, and re-assigning exclusively one of the remaining computing units to exclusively one of the sub-sub-intervals.

14. The method of claim 10, wherein all data objects that were already assigned to any of the remaining computing units that are still available for use remain assigned to the same computing unit as they already were.

15. The method of claim 1, wherein, during said step of subjecting the data objects that have been distributed over the N computing units to processing operations, one or more additional computing units become available in addition to said N computing units, upon which a step of redistributing the data objects is executed whereby data objects are selected from each of the N computing units and re-assigning the selected data objects of each of the computing units to the one or more additional computing units, whereby all of the N computing units contribute a share of the data objects that are re-assigned to the one or more additional computing units.

* * * * *

UNITED STATES PATENT AND TRADEMARK OFFICE
CERTIFICATE OF CORRECTION

PATENT NO. : 11,609,354 B2
APPLICATION NO. : 16/301705
DATED : March 21, 2023
INVENTOR(S) : Timothy Paul Nyberg et al.

Page 1 of 1

It is certified that error appears in the above-identified patent and that said Letters Patent is hereby corrected as shown below:

On the Title Page

On the page 2, in Column 2, Item (56) under "Other Publications", Line 2, delete "Computationa" and insert -- Computational --.

In the Specification

In Column 3, Line 60, delete "and)" and insert -- and ) --.

In Column 4, Line 66, delete "$D_N^*$is" and insert -- $D_N^*$ is --.

In the Claims

In Column 10, Line 35, in Claim 8, delete "$(j_1 \ldots j_\lambda)$" and insert -- $(j_1 \ldots j_\Lambda)$ --.

Signed and Sealed this
Twenty-third Day of May, 2023

Katherine Kelly Vidal
*Director of the United States Patent and Trademark Office*